United States Patent
Migliori et al.

(10) Patent No.: US 12,304,147 B2
(45) Date of Patent: May 20, 2025

(54) 3D PRINTER WITH INCREASED UNIFORMITY OF BUILD CHAMBER TEMPERATURE

(71) Applicant: Stratasys, Inc., Eden Prairie, MN (US)

(72) Inventors: Bryan Daniel Migliori, Lakeville, MN (US); Kyra Elizabeth Neal, Crystal, MN (US); Benjamin L. Braton, Otsego, MN (US)

(73) Assignee: STRATASYS, INC., Eden Prairie, MN (US)

( * ) Notice: Subject to any disclaimer, the term of this patent is extended or adjusted under 35 U.S.C. 154(b) by 73 days.

(21) Appl. No.: 17/825,290

(22) Filed: May 26, 2022

(65) Prior Publication Data

US 2023/0382047 A1 Nov. 30, 2023

(51) Int. Cl.
*B29C 64/118* (2017.01)
*B29C 64/25* (2017.01)
*B29C 64/295* (2017.01)
*B29C 64/364* (2017.01)
*B33Y 30/00* (2015.01)

(52) U.S. Cl.
CPC .......... *B29C 64/364* (2017.08); *B29C 64/295* (2017.08); *B33Y 30/00* (2014.12)

(58) Field of Classification Search
CPC ..... B29C 64/295; B29C 64/364; B29C 64/30; B29C 64/20; B29C 64/371; B33Y 30/00; B33Y 40/00; F15D 1/00; F15D 1/02; F15D 1/001; F15D 1/0005; F24H 3/00; F24H 3/02; F24H 3/04
See application file for complete search history.

(56) References Cited

U.S. PATENT DOCUMENTS

| | | | |
|---|---|---|---|
| 5,341,848 A * | 8/1994 | Laws | G01F 1/42 138/40 |
| 5,866,058 A | 2/1999 | Batchelder et al. | |
| 6,004,124 A | 12/1999 | Swanson et al. | |
| 6,547,995 B1 | 4/2003 | Comb | |
| 6,722,872 B1 | 4/2004 | Swanson et al. | |

(Continued)

FOREIGN PATENT DOCUMENTS

| | | |
|---|---|---|
| WO | 2016014543 A1 | 1/2016 |
| WO | WO-2023086858 A1 * | 5/2023 |

*Primary Examiner* — Galen H Hauth
*Assistant Examiner* — Baileigh Kate Darnell
(74) *Attorney, Agent, or Firm* — Westman, Champlin & Koehler, P.A.

(57) ABSTRACT

An extrusion-based 3D printer configured to print 3D parts in a layer-by-layer manner includes a heated build chamber, a build platen within the chamber and at least one print head configured to extrude material onto the build platen or previously extruded material wherein the at least one print head is configured to move in a print plane. The 3D printer includes at least one air intake and exhaust system that includes ductwork having an inlet configured to intake air from the build chamber and an outlet configured to exhaust air into the build chamber proximate the build plane, a fan proximate the inlet and configured to draw air into the ductwork through the inlet and propel the air towards the outlet, a heater proximate the outlet, the heater configured to heat the air as the air passes the heater and a perforated diffuser plate between the fan and the heater.

21 Claims, 11 Drawing Sheets

(56) References Cited

U.S. PATENT DOCUMENTS

| | | | |
|---|---|---|---|
| 6,817,941 B1 * | 11/2004 | Gatov | B01L 1/04 55/385.2 |
| 7,063,285 B1 | 6/2006 | Turley et al. | |
| 7,127,309 B2 | 10/2006 | Dunn et al. | |
| 7,604,470 B2 | 10/2009 | LaBossiere et al. | |
| 7,625,200 B2 | 12/2009 | Leavitt | |
| 7,938,356 B2 | 5/2011 | Taatjes et al. | |
| 8,403,658 B2 | 3/2013 | Swanson | |
| 8,439,665 B2 | 5/2013 | Batchelder et al. | |
| 8,985,497 B2 | 3/2015 | Mannella et al. | |
| 9,073,263 B2 | 7/2015 | Mannella et al. | |
| 9,108,360 B2 | 8/2015 | Comb et al. | |
| 10,265,941 B2 | 4/2019 | Schuller et al. | |
| 11,161,336 B2 | 11/2021 | Schuller et al. | |
| 2004/0104515 A1 | 6/2004 | Swanson et al. | |
| 2014/0352404 A1 * | 12/2014 | Kumagai | G01N 1/2247 73/23.31 |
| 2015/0096717 A1 | 4/2015 | Batchelder et al. | |
| 2015/0097053 A1 | 4/2015 | Batchelder et al. | |
| 2015/0097308 A1 | 4/2015 | Batchelder et al. | |
| 2016/0214175 A1 | 7/2016 | Nordstrom | |
| 2018/0126650 A1 * | 5/2018 | Murphree | B08B 5/04 |
| 2019/0240969 A1 * | 8/2019 | Schuller | B33Y 30/00 |
| 2020/0298480 A1 * | 9/2020 | Haerst | B22F 12/30 |

\* cited by examiner

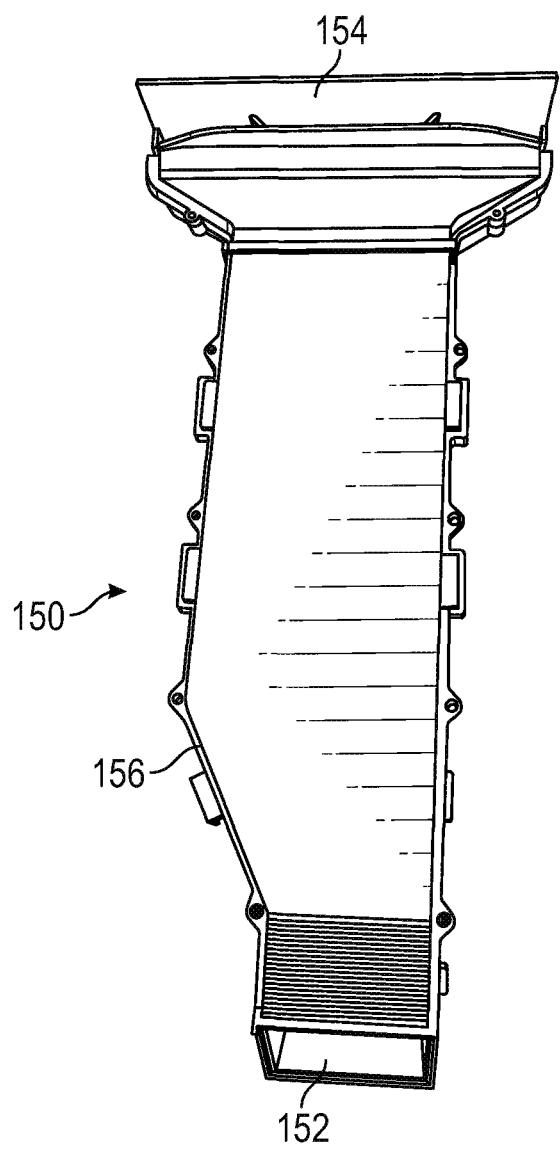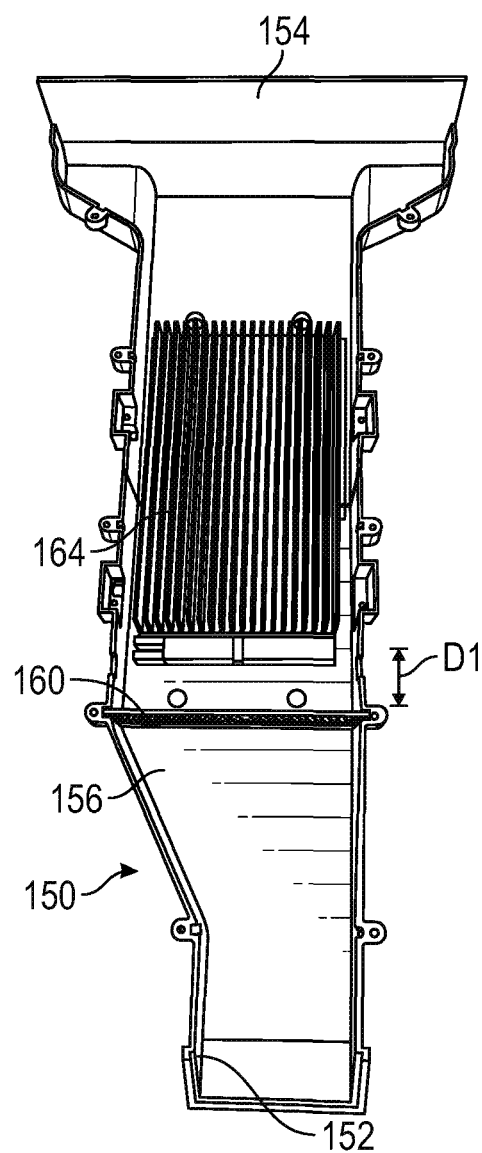
FIG. 5                    FIG. 6

3D PRINTER WITH INCREASED UNIFORMITY OF BUILD CHAMBER TEMPERATURE

BACKGROUND

The present disclosure relates to additive manufacturing systems for 3D printing of parts by material extrusion techniques. In particular, the present disclosure relates to a 3D printer with increased temperature uniformity across the width of a build envelope of the build chamber, whether the build chamber includes one heating zone or a plurality of heating zones. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional solid part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion, ink jetting, powder bed fusion, binder jetting, direct energy deposition, electrophotographic imaging, and vat photopolymerization (including digital light curing and stereolithographic processes).

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

A multi-axis additive manufacturing system may be utilized to print 3D parts using fused deposition modeling techniques. The multi-axis system may include a robotic arm movable in multiple degrees of freedom. The multi-axis system may also include a build platform movable in two or more degrees of freedom and independent of the movement of the robotic arm to position the 3D part being built to counteract effects of gravity based upon part geometry. An extruder may be mounted at an end of the robotic arm and may be configured to extrude material with a plurality of flow rates, wherein movement of the robotic arm and the build platform are synchronized with the flow rate of the extruded material to build the 3D part. The multiple axes of motion can utilize complex tool paths for printing 3D parts, including single continuous 3D tool paths for up to an entire part, or multiple 3D tool paths configured to build a single part. Use of 3D tool paths can reduce issues with traditional planar toolpath 3D printing, such as stair-stepping (layer aliasing), seams, the requirement for supports, and the like. Without a requirement to print layers of a 3D part in a single build plane, the geometry of part features may be used to determine the orientation of printing.

There is a need to improve temperature uniformity in 3D printers to improve part quality whether in a 3D printer with one heating zone or a plurality of heating zones. There is also a need to substantially evenly distribute air flow over in-duct heaters to increase the useful life of the heaters.

SUMMARY

An aspect of the present disclosure relates to an extrusion-based 3D printer configured to print 3D parts in a layer-by-layer manner. The 3D printer includes a heated build chamber, a build platen within the chamber and at least one print head configured to extrude material onto the build platen or previously extruded material wherein the at least one print head is configured to move in a print plane. The 3D printer includes at least one air intake and exhaust system that includes ductwork having an inlet configured to intake air from the build chamber and an outlet configured to exhaust air into the build chamber proximate the build plane, a fan proximate the inlet and configured to draw air into the ductwork through the inlet and propel the air towards the outlet, a heater proximate the outlet, the heater configured to heat the air as the air passes the heater and a perforated diffuser plate between the fan and the heater. The perforated diffuser plate is configured to resist air flow to raise a pressure on an upstream side of the diffuser plate to be substantially constant across a cross-sectional area of the ductwork proximate the diffuser plate. The diffuser plate having through bores configured in a pattern to allow air to pass therethrough such that the air has a substantially uniform velocity profile with laminar flow as the air engages the heater.

Another aspect of the present disclosure relates to a 3D printer system configured to print parts by depositing molten extruded material along tool paths. The system includes a chamber comprising opposing side walls and a platen on which molten extruded build material is to be deposited along tool paths to print a part in a layer-wise manner within the chamber, the platen configured to move between the opposing side walls. The system includes a heating system for locally heating the chamber in a build plane above the platen. The heating system comprising opposing air intake and exhaust systems located on exterior surfaces of the opposing side walls. Each air intake and exhaust system includes ductwork having an inlet configured to intake air from the build chamber and an outlet configured to exhaust air into the build chamber proximate the build plane, a fan within the ductwork proximate the inlet and configured to draw air into the ductwork through the inlet and propel the air towards the outlet, a heater within the ductwork proximate the outlet, the heater configured to heat the air as the air passes the heater before discharge from the outlet, and a perforated diffuser plate between the fan and the heater. The perforated diffuser plate configured to resist air flow to raise a pressure on an upstream side of the diffuser plate to be substantially constant across a cross-sectional area of the ductwork proximate the diffuser plate, the diffuser plate having through bores configured in a pattern to allow air to pass therethrough such that the air has a substantially uniform velocity profile with laminar flow as the air engages the heater.

BRIEF DESCRIPTION OF THE DRAWINGS

FIG. 5 is a perspective view of a straight ductwork with a diffuser plate.

FIG. 6 is a side view of the straight ductwork with the diffuser plate.

DETAILED DESCRIPTION

Figure 1:
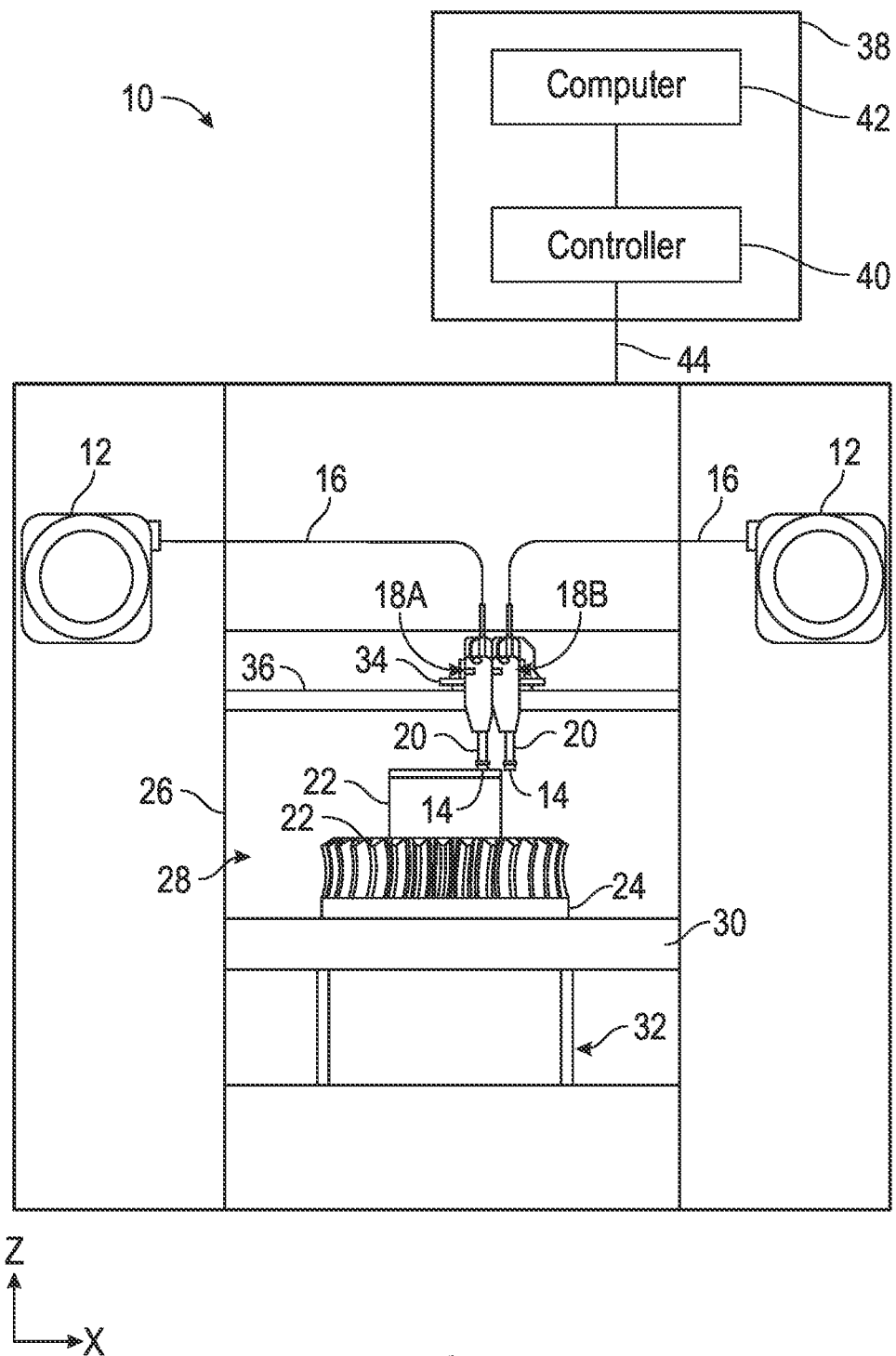
FIG. 1 is a front view of a 3D printer configured to print printed parts and support structures.

The present disclosure relates a 3D printer with increased temperature uniformity in and about the width of a printing envelope within a heated chamber by utilizing a perforated diffuser plate within the ductwork of an air intake and exhaust systems. In some printer systems, the temperature within the printer is purposefully kept warmer at the upper portion of the print volume, where the printing operation is occurring on a platen. Having a cooler temperature environment for the earlier portion of a print job can aid the part in the solidification process. However, a varying temperature within the heated chamber across the width of the platen, at a particular z height, typically due to non-uniform air flow, can cause parts printed at various positions on the platen to experience a different thermal history, and thus quality of each part may potentially vary. Increasing temperature uniformity at a particular z height across the printing envelope impacts part quality by increasing the uniformity of adhesion between extruded rows within a layer (intralayer) and between extruded layers (interlayer). Further, the uniform temperature across the platen (X & Y) aids in maintaining the 3D part being printed at a substantially constant intralayer temperature which aids preventing part stresses when an extruded layer cools, resulting in reduced curling and delamination between layers. Additionally, printing a 3D part in an environment that has a substantially uniform temperature in and about the printing envelope enhances surface finish, prevents thermal degradation due to excessive heating or poor adhesion due to excessive cooling.

Exemplary air intake and exhaust systems for a 3D printer includes ductwork having an inlet that draws air from the heated chamber with a fan, heats the air with a heater within the ductwork, and exhausts the heated air through an outlet back into the heated chamber, proximate the printing envelope, the z height where printing occurs on a part build. The cold air inlet can be located proximate a vertical location of the outlet, such that the ductwork is substantially "U" shaped. Alternatively, the inlet can be located below the outlet such that the heating ductwork has a substantially straight air flow path, where the air inlet is at a lower z height and draws from cooler air within the printing volume. Other configurations of the inlet and the outlet are also within the scope of the present disclosure.

Whichever air inlet configuration is used for the air intake and exhaust systems, a fan is located within the ductwork or proximate the inlet to the ductwork, where the fan draws the heated air into the heat distribution system through the inlet and propels the air through the ductwork of the heat distribution system and out of the outlet and into the printing envelope. The air intake and exhaust system includes the heater, typically a resistance heater, that is positioned within the ductwork between the fan and the outlet to heat the air to a selected oven temperature.

A typical fan, such as a centrifugal fan, draws air into the ductwork of the heat distribution system and propels the air towards the outlet typically unevenly distributes the volumetric flow rate of the air. The air flow in the ductwork depends on the configuration or shape of the duct itself, and the air flow rate will vary significantly across its width, with a higher volumetric flow rate proximate the closest wall where air is discharged from the fan, and a lower volumetric flow rate at an opposite wall. The uneven volumetric flow rate distribution across the duct width results in uneven air flow at the outlet, and uneven heating across the X and Y plane within the build envelope of the oven. The uneven heat within the build envelope can result in uneven layer adhesion in some regions of the part and overheating in other regions. Additionally, in some instances, air passing through one region of the heater proximate the wall experiences such a low volumetric flow rate that there insufficient heat exchange, resulting in a portion of the heater to overheat and to discolor, melt or scorch the ductwork wall surface, and/or prematurely cause the heater to fail.

The present disclosure utilizes a perforated diffuser plate within the ductwork of the air intake and exhaust systems between the fan and the heater to cause the air flowing through the ductwork to be substantially uniform in velocity profile and volumetric flow rate across the cross-sectional area of the duct. The perforated diffuser plate restricts the cross-sectional area in the ductwork through which air can pass. The restricted cross-sectional area causes an increase and substantial equalization in pressure at the inlet side of the perforated diffuser plate. With the substantial equalization of pressure across the area of the inlet side of the perforated diffuser plate, a substantially uniform velocity profile and volumetric air flow rate through the ductwork past the diffuser plate results. Frictional drag proximate the ductwork walls will still occur, but will be minor. The flow of air across the cross-sectional area of the ductwork is substantially laminar in nature, and the air entering the inlet to the heater will be at a substantially uniform flow rate, resulting in a more uniform volumetric flow rate and temperature of air exiting the heater. The substantially uniform heating of the air results in a more uniform temperature profile as the air exits the outlet and heats the printing envelope. The more uniform temperature profile increases the quality of the 3D parts being printed by ensuring that each part experiences a substantially similar temperature history regardless of its position on the build platen.

The perforations located within the diffuser plate cause the incoming airflow to intermix and come to a more balanced velocity across the width of the ductwork prior to being heated. The perforations may have substantially uniform diameters, or may be a plurality of hole sizes customized to even further balance the airflow requirements. The percent restriction of the diffuser plate in the ductwork requires a balance between fan power versus backpressure or pressure restriction. If there are too few holes, or too small a percentage of an open surface area in the plate, then a more powerful fan would be required to overcome that pressure restriction. Conversely, if there are too many holes, or too large a percentage of an open surface area, then the air may not intermix adequately, and the pressure may not substantially equalize over the area of the diffuser plate. The result would be an uneven velocity profile, uneven volumetric flow rate through the diffuser plate and through the heater surfaces, and an uneven temperature profile exiting the ductwork. An uneven temperature profile exiting the ductwork translates into an uneven temperature across the build envelope.

An exemplary range of the percentage of open or open surface area, in the diffuser plate is between about 35% and about 75%. A more exemplary range of open space in the diffuser plate is between about 37% and about 65% and even more particularly between about 40% and about 60%.

A typical heating ductwork configuration of the air intake and exhaust system includes a constricted portion where the fan is located. Air exiting the fan transitions to an expansion zone where the cross-sectional area increases, and then a substantially constant cross-sectional area region after the expansion zone where the heater is located. The diffuser plate is preferably placed within the ductwork in the substantially constant cross-sectional area zone, proximate the inlet to the heater, to induce substantially laminar and even flow over the heater to provide a more constant temperature profile as the air exits the ductwork. The diffuser plate is typically located about one to about two diffuser plate heights from the inlet to the heater so that the air flow is substantially laminar over the heater.

The present disclosure may be used with any suitable extrusion-based additive manufacturing system. For example, FIG. 1 illustrates a 3D printer 10 that has a substantially horizontal print plane where the part being printed is indexed in a substantially vertical direction as the part is printed in a layer by layer manner using two print heads 18A, 18B. The illustrated 3D printer 10 uses two consumable assemblies 12, where each consumable assembly 12 is an easily loadable, removable, and replaceable container device that retains a supply of a consumable filament for printing with 3D printer 10. Typically, one of the consumable assemblies 12 contains a part material filament, and the other consumable assembly 12 contains a support material filament, each supplying filament to one print head 18A or 18B. However, both consumable assemblies 12 may be identical in structure. Each consumable assembly 12 may retain the consumable filament on a wound spool, a spoolless coil, or other supply arrangement, such as discussed in Swanson et al., U.S. Pat. No. 8,403,658; Turley et al., U.S. Pat. No. 7,063,285; Taatjes at al., U.S. Pat. No. 7,938,356; and Mannella et al., U.S. Pat. Nos. 8,985,497 and 9,073,263.

Each print head 18A and 18B is an easily loadable, removable and replaceable device comprising a housing that retains a liquefier assembly 20 having a nozzle tip 14. Each print head 18A and 18B is configured to receive a consumable material, melt the material in liquefier assembly 20 to product a molten material, and deposit the molten material from a nozzle tip 14 of liquefier assembly 20. Examples of suitable liquefier assemblies for print head 18 include those disclosed in Swanson et al., U.S. Pat. No. 6,004,124; LaBossiere, et al., U.S. Pat. No. 7,604,470; Leavitt, U.S. Pat. No. 7,625,200; and Batchelder et al., U.S. Pat. No. 8,439,665. Other suitable liquefier assemblies include those disclosed in U.S. Patent Publications Nos. 2015/0096717 and 2015/0097053; and in PCT publication No. WO2016014543A.

Guide tube 16 interconnects consumable assembly 12 and print head 18A or 18B, where a drive mechanism of print head 18A or 18B (or of 3D printer 10) draws successive segments of the consumable filament from consumable assembly 12, through guide tube 16, to liquefier assembly 20 of print head 18A or 18B. In this embodiment, guide tube 16 may be a component of 3D printer 10, rather than a sub-component of consumable assemblies 12. In other embodiments, guide tube 16 is a sub-component of consumable assembly 12, and may be interchanged to and from system 10 with each consumable assembly 12. During a build operation, the successive segments of consumable filament that are driven into print head 18A or 18B are heated and melt in liquefier assembly 20. The melted material is extruded through nozzle tip 14 in a layer wise pattern to produce printed parts.

3D printer 10 prints 3D parts or models and corresponding support structures (e.g., 3D part 22 and support structure 24) from the part and support material filaments, respectively, of consumable assemblies 12, using a layer-based, additive manufacturing technique. Suitable additive manufacturing systems for system 10 include fused deposition modeling 3D printers developed by Stratasys, Inc., Eden Prairie, MN under the trademarks "FDM".

As shown, 3D printer 10 includes cabinet 26, chamber 28, platen 30, platen gantry 32, head carriage 34, and head gantry 36. Cabinet 26 is a structural component of system 10 and may include multiple structural sub-components such as support frames, housing walls, and the like. In some embodiments, cabinet 26 may include container bays configured to receive consumable assemblies 12. In alternative embodiments, the container bays may be omitted to reduce the overall footprint of 3D printer 10. In these embodiments, consumable assembly 12 may stand proximate to cabinet 26, while providing sufficient ranges of movement for guide tubes 16 and print heads 18 that are shown schematically in FIG. 1.

Platen 30 is a platform on which 3D part 22 and support structure 24 are printed in a layer-by-layer manner, and is supported by platen gantry 32. In some embodiments, platen 30 may engage and support a build substrate, which may be a tray substrate as disclosed in Dunn et al., U.S. Pat. No. 7,127,309, fabricated from plastic, corrugated cardboard, or other suitable material, and may also include a flexible polymeric film or liner, tape, or other disposable fabrication for adhering deposited material onto the platen 30 or onto the build substrate. Platen gantry 32 is a gantry assembly configured to move platen 30 along (or substantially along) the vertical z-axis.

Head carriage 34 is a unit configured to receive and retain one or both print heads 18A and 18B, and is supported by head gantry 36. Head carriage 34 preferably retains each print head 18A and 18B in a manner that prevents or restricts movement of the print head 18 relative to head carriage 34 so that nozzle tip 14 remains in the x-y build plane, but allows nozzle tip 14 of the print head 18 to be controllably moved out of the x-y build plane through movement of at least a portion of the head carriage 34 relative the x-y build plane (e.g., servoed, toggled, or otherwise switched in a pivoting manner).

In the shown embodiment, head gantry 36 is a gantry mechanism configured to move head carriage 34 (and the retained print heads 18A and 18B) in (or substantially in) a horizontal x-y plane above platen 30. Examples of suitable gantry assemblies for head gantry 36 include those disclosed in Swanson et al., U.S. Pat. No. 6,722,872; and Comb et al., U.S. Pat. No. 9,108,360, where head gantry 36 may also couple to deformable baffles (not shown) that define a ceiling for chamber 28. Head gantry 36 may utilize any suitable bridge-type gantry or robotic mechanism for moving head carriage 34 (and the retained print heads 18), such as with one or more motors (e.g., stepper motors and encoded DC motors), gears, pulleys, belts, screws, robotic arms, and the like.

In an alternative embodiment, platen 30 may be configured to move in the horizontal x-y plane within chamber 28, and head carriage 34 (and print heads 18A and 18B) may be configured to move along the z-axis. Other similar arrangements may also be used such that one or both of platen 30 and print heads 18A and 18B are moveable relative to each other. Platen 30 and head carriage 34 (and print heads 18A and 18B) may also be oriented along different axes. For example, platen 30 may be oriented vertically and print heads 18A and 18B may print 3D part 22 and support structure 24 along the x-axis or the y-axis.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to 3D printer 10.

Controller assembly 38 may communicate over communication line 44 with print heads 18A and 18B, chamber 28 (e.g., with a heating unit for chamber 28), head carriage 34, motors for platen gantry 32 and head gantry 36, and various sensors, calibration devices, display devices, and/or user input devices. In some embodiments, controller assembly 38 may also communicate with one or more of platen 30, platen gantry 32, head gantry 36, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen 30 to a predetermined height within chamber 28. Controller assembly 38 may then direct head gantry 36 to move head carriage 34 (and the retained print heads 18A and 18B) around in the horizontal x-y plane above chamber 28. Controller assembly 38 may also direct print heads 18A and 18B to selectively draw successive segments of the consumable filaments from consumable assembly 12 and through guide tubes 16, respectively.

While, FIG. 1 illustrates an additive manufacturing system, commonly referred to as a 3D printer, 10 where a build plane is in a substantially horizontal x-y plane and the platen 30 is moved in a z direction substantially normal to the substantially horizontal x-y build plane, the present disclosure is not limited to a 3D printer 10 as illustrated in FIG. 1

Figure 2:
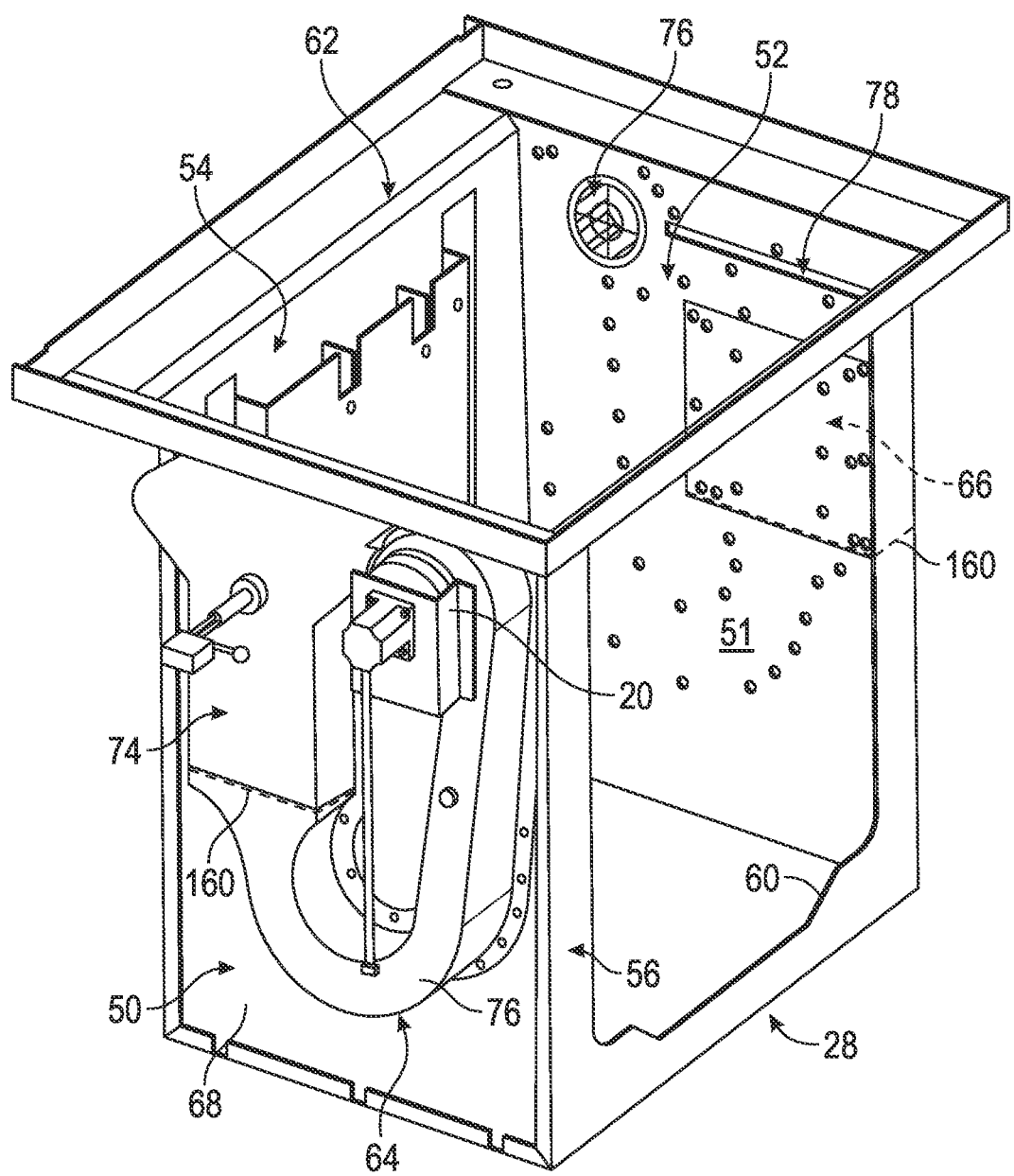
FIG. 2 is perspective view of the chamber of this disclosure having an air intake and exhaust system with a diffuser plate.

As illustrated in FIG. 2, heated air according to this disclosure is provided within chamber 28 in a unique, energy efficient manner. The chamber 28 has an interior 51 defined by four walls, two opposing side walls 50 and 52, a back wall 54 and a front wall 56. The front wall 56 has a door (not shown) that is removable or positioned on a hinge mechanism for providing access into the interior 51 through door opening 60. The print heads 18A and 18B are positioned at the top 62 of the chamber 28, the print heads 18A and 18B not shown for clarity in FIG. 2 but illustrated in position in FIG. 1.

Air intake and exhaust systems 64 and 66 are positioned on exterior sides 68 of opposing side walls 50 and 52. Only one air intake and exhaust system 64 will be described since both air intake and exhaust systems 64 and 66 are identical in construction. The air intake and exhaust system 64 includes a blower motor and blower 70 that directs air through ductwork 76 to a heating element 74. Sidewalls 50 and 52 both include an intake port 76 and exhaust port 78 disposed in sidewalls 50 and 52 such that intake port 76 provides access to air for blower motor and blower 70 and exhaust port 78 provides access for air heated by the heating element 74 into the interior 51 of the chamber 28. Air intake and exhaust systems 64 and 66 include a diffuser plate 160 between the blower motor and blower 70 and the heater or heating element 74.

While the 3D part 22 and the support structure 24 are printed, it is preferred that that the build envelope have a substantially uniform temperature profile across the platen width at a particular z height. As part of a print project, a part may be built on any particular XY location across the print platen. Often, many parts are printed during a print job, with some parts being placed on one side of a platen, or in a corner, or in the center region. Sometimes some parts are wider in an X or Y dimension than others, and some parts may be larger in height or mass than others. Regardless of their dimensions or placement, they must be provided with an equivalent thermal experience during the build process. Having a substantially uniform hot air velocity flow profile ensures that all parts being made, regardless of placement location on the platen, experience the same temperature profile during the printing operation. Small or detailed parts experience quicker heat transfer through both conduction and convection, than large bulky parts. Having a substantially uniform temperature profile also prevents some parts from experiencing rapid or uneven heating and cooling, which causes intra-part stresses that can result in curling and layer delamination. Additionally, the substantially uniform temperature profile prevents the creation of overly hot temperature zones across the platen width, and ensures that that thermal degradation of any overly hot part materials will be avoided As mentioned above with respect to FIG. 2, a typical heating system intakes air from the heated chamber of the printer using a fan to draw the air through the inlet. The fan then propels the air through the ductwork and towards the outlet. The ductwork includes a heater which heats the air as the air passes through it. However, the flow from a typical fan has a non-uniform velocity profile and flow distribution within a duct where the flow rate and velocity will be higher proximate an outer wall in the direction of travel relative to the inner wall due to the centrifugal force impart on the air by the fan.

Figure 3:
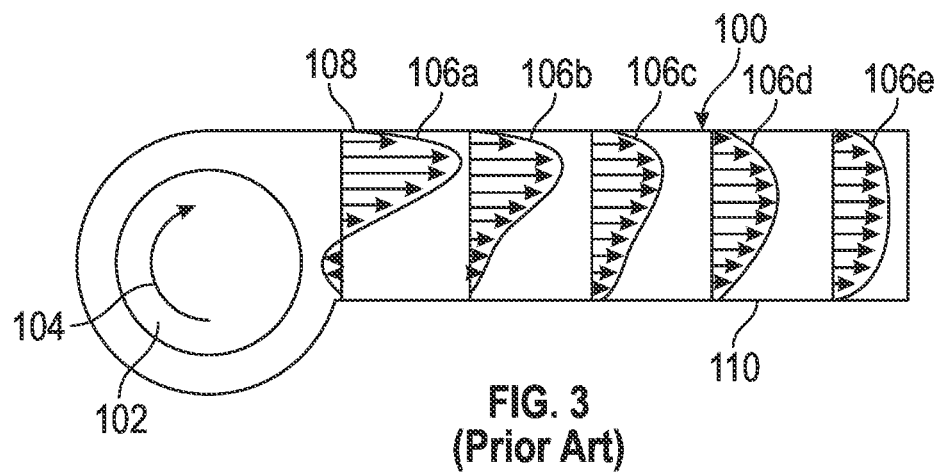
FIG. 3 is a schematic view of velocity profiles of air propelled by a fan in ductwork.

Referring to FIG. 3, a typical air velocity profile propelled by a fan along a substantially straight duct 100 is illustrated. As a fan 102 is rotated in the direction of arrow 104, a velocity profile 106a has a higher velocity and volumetric flow rate proximate wall 108 and a lower velocity and volumetric flow rate proximate a wall 110. As the air travels along the duct 100, the maximum velocity profile begins to change and slow at profile 106b, and further equalize at profile 106c. As the air travels down the duct 100 away from the fan 102, the velocity profile becomes more symmetrical at 106d, due to frictional drag at the walls until the overall substantially laminar and symmetrical flow distribution is obtained at profile 106e.

In order to obtain a substantially uniform and symmetrical velocity profile and laminar flow, a substantial length of ductwork is required that typically is not feasible in a 3D printer, especially when printers are small in size. In many instances, the heater panel is constrained to a small geometry and space. As such, when the air passes over a heater in the ductwork, a non-uniform velocity profile results in a non-uniform temperature distribution. For example, when the air having a velocity profile 106a, the region proximate the wall 108 will be heated to a higher temperature than the region proximate the wall 110. In some instances when the air velocity is sufficiently low in some regions of the ductwork an insufficient amount of heat is transferred from the heater to the air which can result in heater discoloration and premature heater failure.

Figure 4:
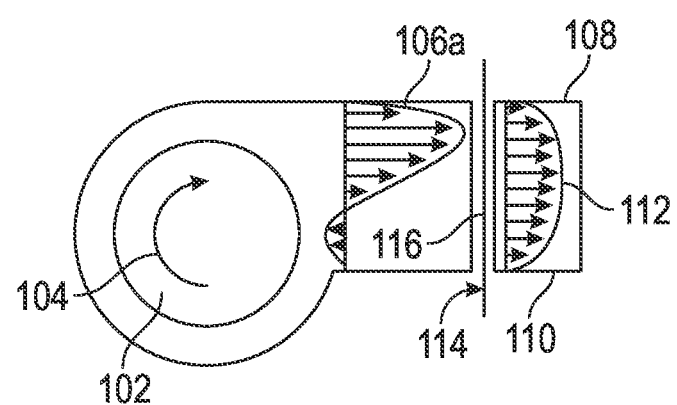
FIG. 4 is a schematic view of velocity profiles of a propelled by a fan with a diffuser plate in the ductwork.

Referring to FIG. 4, a velocity profile of the same fan 102 as illustrated in FIG. 3 can be transformed from a non-uniform velocity profile 106a to a substantially uniform velocity profile 112 with substantially laminar flow, even though the distance before the heater unit is not adequate to achieve uniformity, by positioning a perforated diffuser plate 114 in the ductwork. The diffuser plate 114 spans the cross-sectional area ductwork and includes restrictions in the flow path to modify the irregular flow pattern. In one example, a diffuser plate with a plurality of substantially uniformly spaced through bores having substantially uniform diameters is placed in the ductwork upstream of the heater. The diffuser plate resists flow of air through the ductwork, which builds backpressure on an upstream side 116 of the diffuser plate 114, such that the pressure proximate the upstream side 116 of the diffuser plate 114 is made substantially uniform.

The substantially equalized pressure proximate the upstream side 116 of the diffuser plate 114 forces air through the through bores within the diffuser plate, which results in a substantially uniform velocity profile 112. The air exiting the diffuser plate has a substantially uniform velocity profile 112, with a resulting and slowed substantially laminar flow. The more evenly and consistently the air fed to the heater inlet can be provided, the more uniformly heat exchange can occur across the heater device. As a result, the more uniformly the temperature profile becomes of the air exiting the ductwork. The increased temperature uniformity extends to the consistency of heating capability of all of the build parts distributed across the build platen.

The length of ductwork required to achieve laminar flow in ductwork downstream of the diffuser plate and prior to the heating unit with a substantially rectangular cross-section is defined by the following equation:

$$L_e = 0.04 R_e h \qquad \text{(Equation 1)}$$

Where $$R_e = \frac{Vh}{\mu} \qquad \text{(Equation 2)}$$

Substituting Equation 2 into Equation 1, results in the following equation $$L_e = \frac{0.04 V h^2}{\mu} \qquad \text{(Equation 3)}$$

Where $L_e$ is the length to develop laminar flow, V is the average velocity, h is the distance between two opposing sides of the ductwork, μ is the kinematic velocity of the fluid and $R_e$ is the Reynold's number, which for laminar flow is less than 2,000.

The diffuser screen can be used with any suitable ductwork of the air intake and exhaust systems including a substantially straight ductwork path 150 for air inlet, heater and air exit, as illustrated in FIGS. 5 and 6. The substantially straight ductwork 150 draws air in with a blower motor and blower (not shown) proximate an inlet 152 that is located proximate a bottom of the build chamber due to the configuration of the chamber, drawing in cooler air to be reheated. The ductwork 150 includes an exhaust port 154 that is aligned with the build envelope in the 3D printer.

The ductwork includes an expansion zone 156 that increases the cross-sectional area of the ductwork 150 from the inlet to allow for equipment, such as heaters, to be placed in the ductwork 150 to provide the heat exchange in the ductwork with the air to heat the chamber to a desired temperature profile. A diffuser plate 160 is positioned within the ductwork 150 after the expansion zone 156 and spans a cross-sectional area of the ductwork 150 to restrict the air flow and equalize the pressure at the upstream side of the diffuser plate 160. The diffuser plate 160 includes uniformly spaced through bores that have a substantially uniform diameters that allow air to pass through at a substantially constant velocity such that laminar flow is established prior to entering the heater 164. The diffuser plate 160 is typically located a distance D1 from the entrance to the heater 164 that allows laminar flow to be established while minimizing the distance D1 between the entrance to the heater and the diffuser plate 160. An exemplary ratio of the distance D1 to the height of the diffuser plate 160 ranges from about 1:1 to about 2:1 to provide substantial laminar flow entering the heater 164.

The air flows over and through the heater 164 to transfer heat into the air. As the air is in a substantially symmetrical laminar flow pattern, the air is more uniformly heated. The more uniformly heated air is then discharged into the heated chamber of the build envelope, resulting in an envelope with a more uniform temperature profile.

Figure 7:
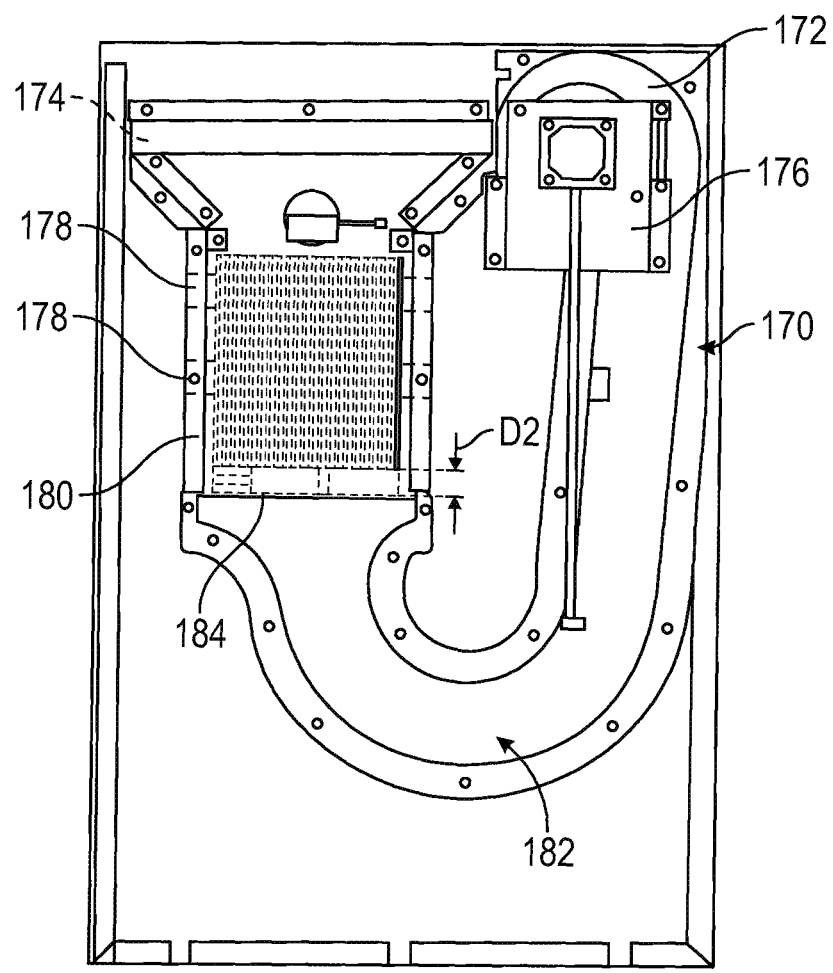
FIG. 7 is a perspective view of a substantially "U" shaped ductwork with a diffuser plate.
Figure 8:
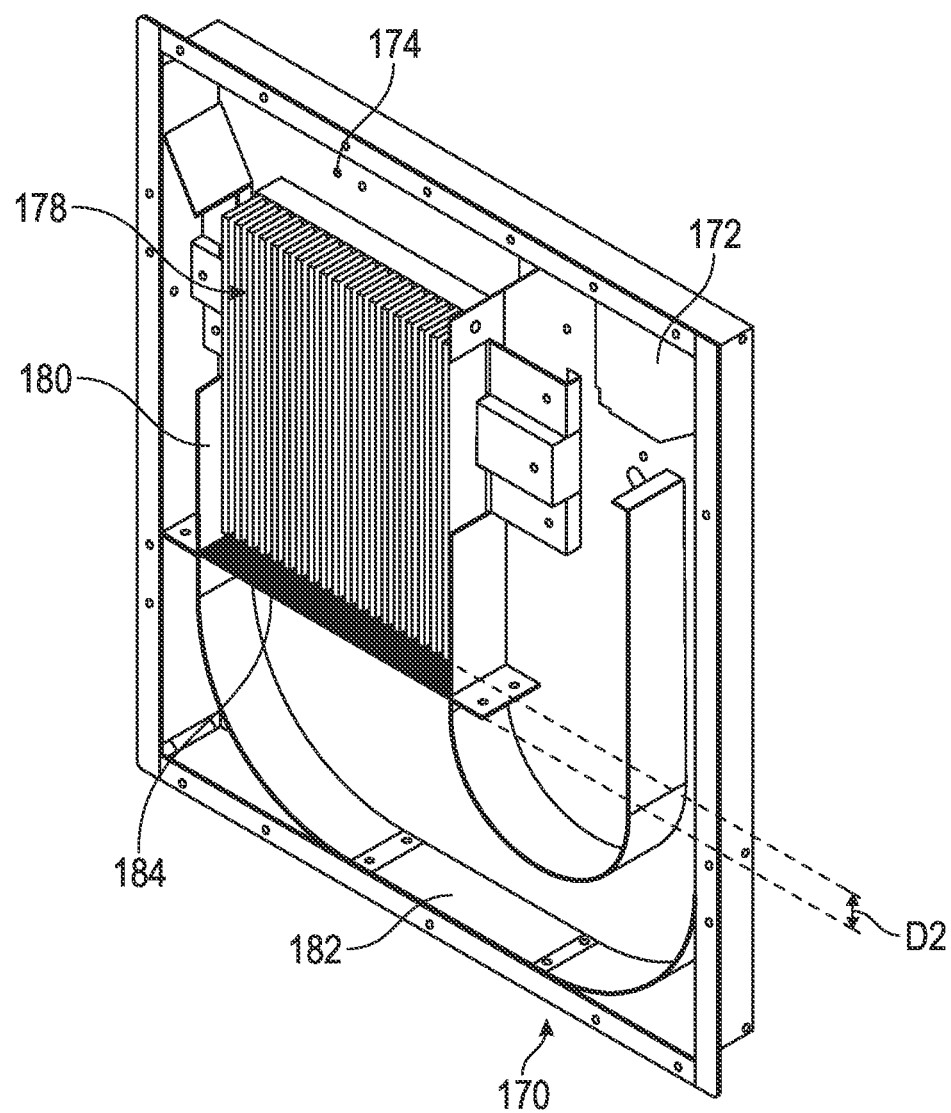
FIG. 8 is a side view of the substantially "U" shaped ductwork with the diffuser plate.

Referring to FIGS. 7 and 8, a substantially "U" shaped ductwork of the air intake and exhaust system is illustrated at 170. The substantially "U" shaped ductwork includes an inlet 172 that draws air into the ductwork 170 and an outlet 174 that exhausts heated air into the heated chamber, where both the inlet 172 and the outlet are proximate the build envelope. Exemplary "U" shaped ductwork is disclosed in Schuller et al. U.S. Pat. Nos. 10,265,941 and 11,161,336.

A fan 176 is located in the ductwork and draws air into the ductwork 170 through the inlet 172 and propels the air towards the outlet 174, such that the air is exhausted into heated chamber proximate the building envelope. A heater 178 is located in the ductwork 170 proximate the outlet 174 and in a substantially straight, vertical region 180 between the outlet 174 and an arcuate region 182 of the ductwork 170. With this "U" shaped airflow pattern, the air velocity pattern typically has a significant flow variation across the cross-sectional area of the ductwork, due to travel around the arcuate region 182. The flow variations through the ductwork would lead to significant thermal variations in the heater unit, and the air exiting the heater unit.

A perforated diffuser plate 184 spans the ductwork in the substantially straight vertical region 180 to restrict the air flow and equalize the pressure at the upstream side of the diffuser plate 184. The diffuser plate 184 includes uniformly spaced through bores 186 with that allow air to pass through them, while forcing the overall flow pattern to normalize to a substantially constant velocity such that laminar flow is established prior to entering the heater 178. The diffuser plate 184 is typically located a distance D2 from the entrance to the heater 178 that allows laminar flow to be established while minimizing the distance D2 between the entrance to the heater and the diffuser plate 184. An exemplary ratio of the distance D2 to the height of the diffuser plate ranges from about 1:1 to about 2:1 to provide substantial laminar flow entering the heater 164.

The air flows over and through the heater 178 to transfer heat into the exhaust air entering the build envelope. As the air is in substantial uniform in flow (minus the wall frictional drag), the air is more uniformly heated. The more uniformly heated air is then discharged into the heated chamber, resulting in a more uniform temperature profile throughout the build envelope.

Figure 9:
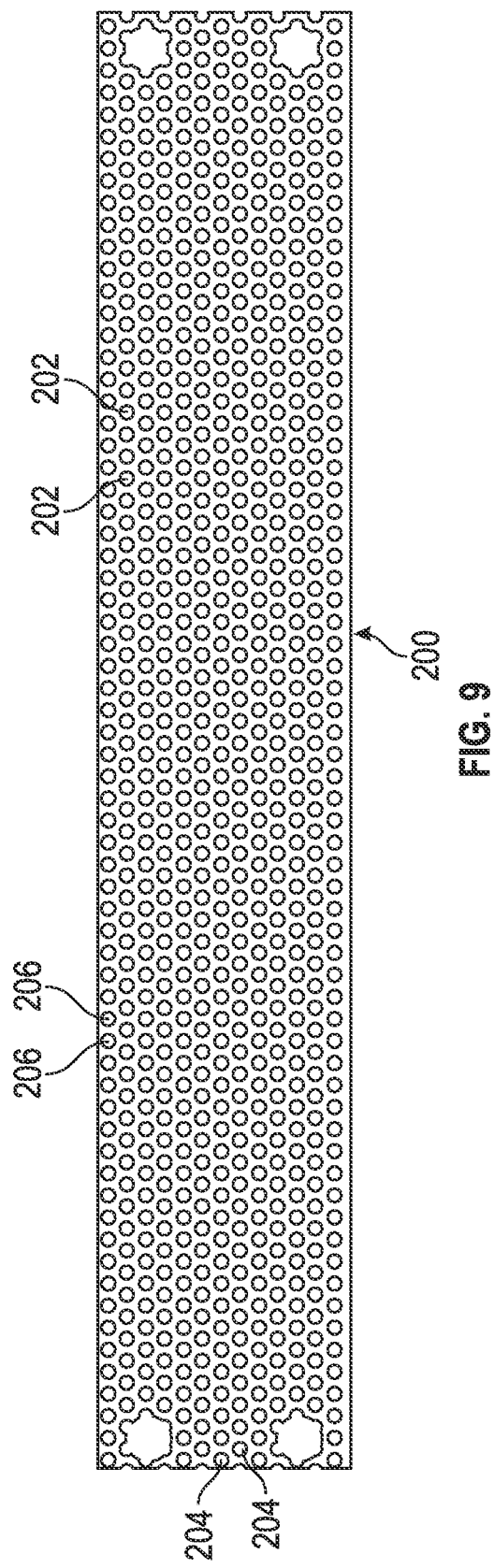
FIG. 9 is a front view of a diffuser plate.

Referring to FIG. 9, an exemplary perforated diffuser plate is illustrated at 200. The diffuser plate 200 includes substantially uniformly spaced through bores 202. Adjacent horizontal rows 204 and vertical rows 206 are offset from each other to aid in obtaining a more uniform velocity profile and volumetric flow rate that leads to substantially laminar flow entering the heater. Other perforation patterns, and other hole sizes or shapes are as effective in equalizing the flow pattern across its width, as long as an optimal amount of air restriction is provided with "open space" for air to flow. It is also possible to provide holes with a variety of perforation sizes, to further optimize and force the air flow to redistribute after exiting the diffuser plate 200. Holes in the portion of the diffuser plate which receives higher velocity air flow with respect to wall region 108 could be made smaller and more restrictive than holes in wall region 110 of the diffuser plate, further providing the capability to change and even out the flow pattern, if desired.

An exemplary range of the percentage of open space in the diffuser plate 200 is between about 35% and about 75% to balance volumetric flow rate with fan power. A more exemplary range of open space in the diffuser plate 200 is between about 37% and about 65% and even more particularly between about 40% and about 60%.

The size of the through bores 202 are determined by balancing the fan power with the desired volumetric flow rate exhausted into the heated chamber. If the percentage of open space is overly constricted by reducing the diameters of the through bores, then excessive pressure can build in the ductwork between the diffuser plate and the fan, which can prevent the fan from functioning properly. Ultimately, the fan motor would likely overheat and prematurely fail. Conversely, if the percentage of open space is too large, then there will not be substantially uniform back pressure at the inlet side of the diffuser plate, resulting in an inconsistent temperature air flow exhausted into the chamber.

By way of non-limiting example, the diameters of the through bores can range from about 0.06 inches to about 0.30 inches, depending upon the size of the ductwork. More particularly, the size of the diameters of the through bores can range from about 0.07 inches and about 0.25 inches. In some embodiments a 0.077 inch diameter through bore is utilized in a diffuser plate with an area of 4.6 in$^2$ with an open area of about 45%. In other embodiments, a 0.25 inch diameter through bore hole size is utilized in a diffuser plate with a 15.84 in$^2$ area, with an open airflow passage area of about 58%. In yet other embodiments, one embodiment the diffuser plate has 0.125 inch diameter through bores in a diffuser plate with an area of 25.02 in$^2$ and an open area of 40%. Again, the size of the through bores and the percentage open area is a balance of fan power and desired exhausted volumetric flow rate of the heated air.

EXAMPLES

The present disclosure is more particularly described in the following examples of calibration algorithms that are intended as illustrations only, since numerous modifications and variations within the scope of the present disclosure will be apparent to those skilled in the art.

Example 1

Figure 10:
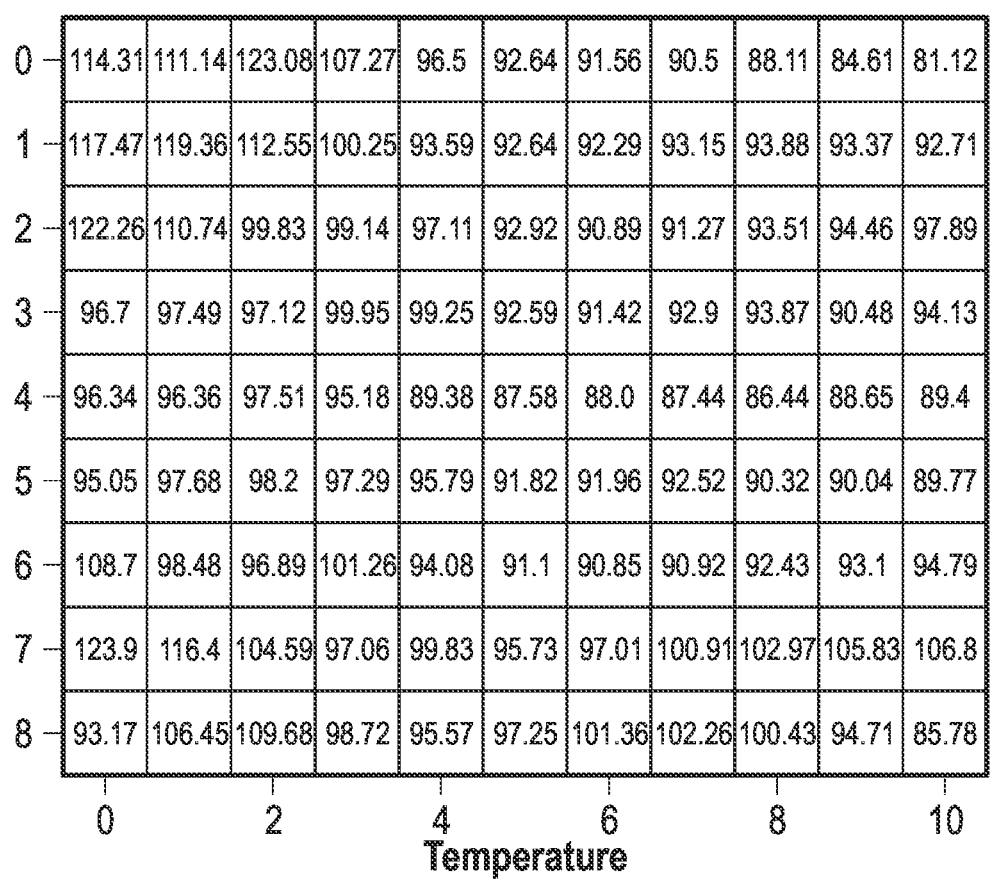
FIG. 10 is a graph of a temperature profile in a build plane where the ductwork does not contain a diffuser plate.

A 3D printer having ductwork as illustrated in FIGS. 5 and 6, that has a substantially straight path between inlet and outlet, on opposing sides of the chamber was used to print 3D parts. A 90° C. setpoint for the chamber was set and the temperature profile was determined and is illustrated in FIG. 10. The build envelope mean temperature was 97.7° C., with individual temperature datapoints having a range of 42.7° C. and a standard deviation of 8.5° C. for different positions across the build platen.

Figure 11:
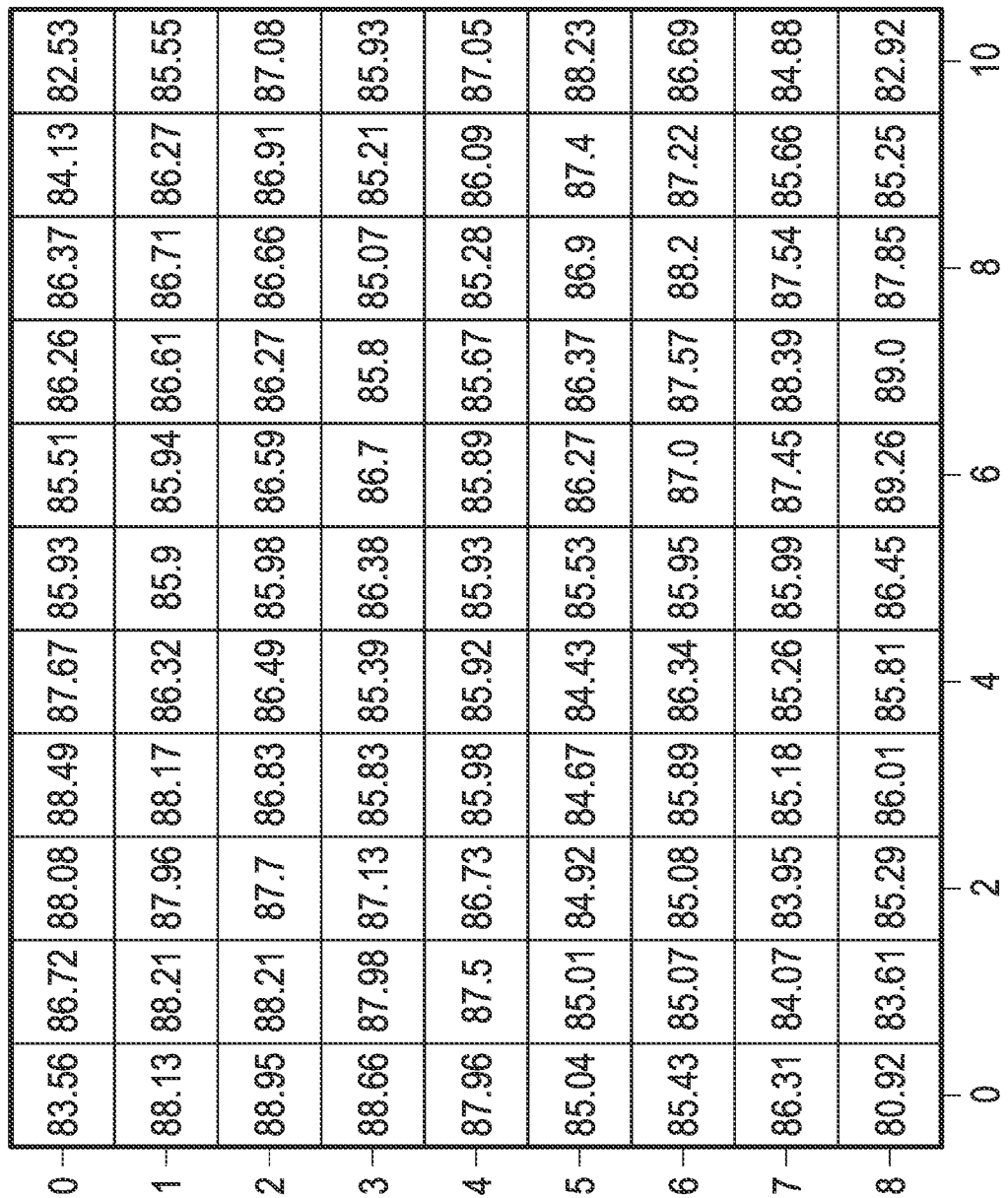
FIG. 11 is a graph of a temperature profile in a build plane where the ductwork includes a diffuser plate.

A diffuser plate with a 0.077 inch diameter through bore is utilized in a diffuser plate with an area of 4.6 in$^2$ with an open area of about 45% was installed as illustrated in FIGS. 5 and 6. The temperature profile was determined as illustrated in FIG. 11. Again, different positions were monitored to determine local temperatures. The mean temperature of the build envelope was 86.3° C., the range of individual temperature data points was 8.3° C. and the standard deviation was 1.4° C.

The use of the diffuser plate in the ductwork resulted in a more consistent temperature profile across the build envelope with a significant decrease in the temperature range by 34.7° C. and a decrease in the standard deviation by 7.1° C. While not being bound to theory, it is believed that the increased temperature consistency is the result of restricting the airflow at the diffuser plate to substantially equalize pressure and the velocity profile exiting the diffuser plate such that the air flow was significantly more equalized and laminar as it engaged with the heater fins. This resulted in the more consistent temperature profile in the ductwork exhaust, and in the overall build envelope.

Example 2

Figure 12:
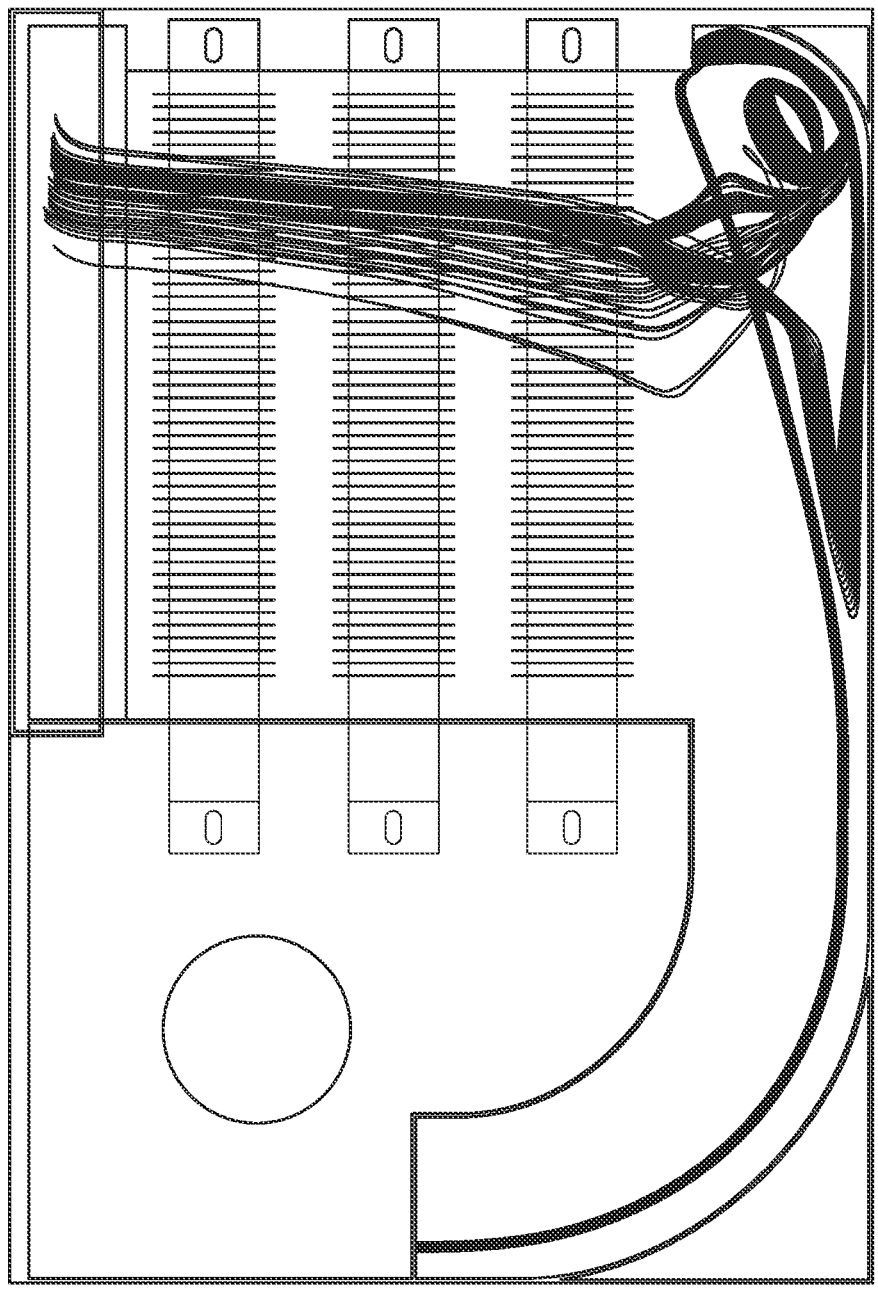
FIG. 12 is a view of simulation or model of air flow in a substantially "U" shaped ductwork without a diffuser plate.

Using the substantially "U" shaped ductwork as illustrated in FIGS. 7 and 8, a theoretically calculated model was created to simulate air velocity profiles based on whether there was a diffuser plate to restrict air flow, or not, as well as the resulting air velocity and temperature readings resulting based on the use of a variety of through bore opening sizes, and D1 positioning locations for the diffuser plate. A first velocity profile is illustrated in FIG. 12, where the ductwork does not include a diffuser plate, and the straight length of the latter portion of the U duct, after the U bend but prior to the heater fins, is approximately 7 inches. The heater ductwork containing fins had a length of roughly 6 inches. The velocity profile illustrates a significant variation in velocity profile across the width of the ductwork where there is a high velocity along the lower wall of the arcuate portion of the ductwork that continues to follow the outer wall and out of the exhaust port. There is little air flow proximate the upper wall of the arcuate portion that follows to inner, upper wall, which results in an uneven flow through the heating unit, and uneven heating of the air across the build envelope.

Figure 13:
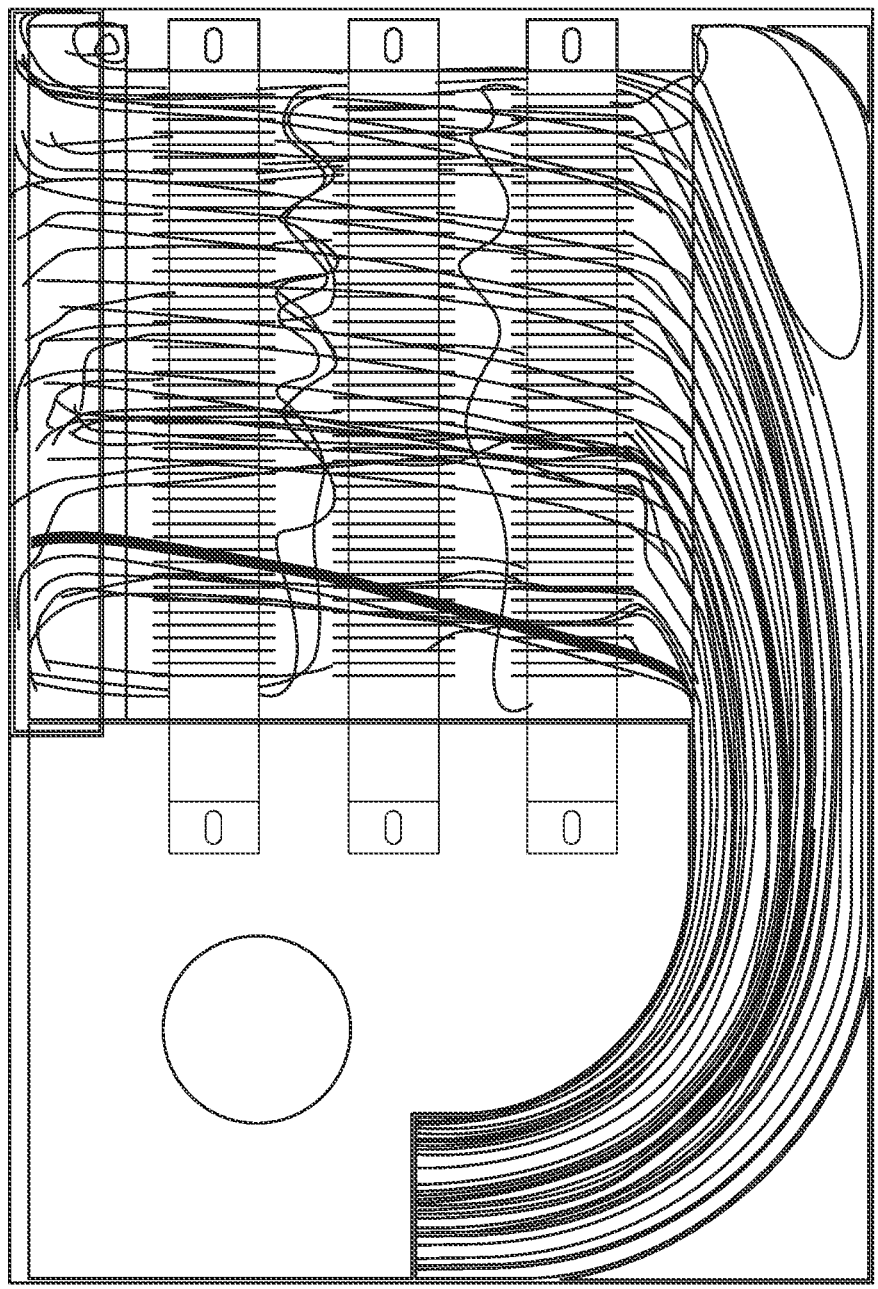
FIG. 13 is a view of simulation or model of air flow in a substantially "U" shaped ductwork with a diffuser plate.

A diffuser plate with consistently sized 0.25 inch diameter through bores, with a 15.84 in² area spanning the area of the ductwork, and with an overall open area of about 58%, was then inserted into the model, being spaced approximately 5.5 inches prior to the heater fins, and another simulation was run. The results are illustrated in FIG. 13 and illustrate a much more even and uniform velocity profile and volumetric flow rate, which will result in a more uniform temperature profile exhausted into the chamber. This in turn results in a more uniform temperature profile in the print envelope, and more consistently heated, better quality 3D parts.

Although the present disclosure may have been described with reference to preferred embodiments, workers skilled in the art will recognize that changes may be made in form and detail without departing from the spirit and scope of the disclosure.

The invention claimed is:

1. An extrusion-based 3D printer configured to print 3D parts in a layer-by-layer manner, the 3D printer comprising:
    a heated build chamber; a build platen within the chamber;
    at least one print head configured to extrude material onto the build platen or previously extruded material wherein the at least one print head is configured to move in a print plane and deposit material in a build envelope; and
    at least one air intake and exhaust system comprising:
    ductwork having an inlet configured to intake air from the build chamber and an outlet configured to exhaust air into the build chamber proximate the build envelope and in a direction substantially parallel to the print plane;
    a fan proximate the inlet and configured to draw air into the ductwork through the inlet and propel the air towards the outlet;
    a heater proximate the outlet, the heater configured to heat the air as the air passes the heater; and
    a perforated diffuser plate within the ductwork and located between the fan and the heater, wherein the perforated diffuser plate is oriented substantially orthogonal to the ductwork in the direction of airflow, wherein the perforated diffuser plate is configured to resist air flow and cause a pressure on an upstream side of the perforated diffuser plate to be raised and be substantially constant across a cross-sectional area of the ductwork proximate the perforated diffuser plate, the perforated diffuser plate having through bores configured in a pattern to allow air to pass therethrough such that the air has a substantially uniform velocity profile with laminar flow as the air engages the heater and when heated and exhausted into the heated build chamber, a temperature profile within the build envelope is more uniform relative to an air intake and exhaust system without the perforated diffuser plate within the ductwork.

2. The 3D printer of claim 1, wherein the perforated diffuser plate has an open space ranging from about 35% to about 75%.

3. The 3D printer of claim 1, wherein the perforated diffuser plate has an open space ranging from about 37% to about 65%.

4. The 3D printer of claim 1, wherein the perforated diffuser plate has an open space ranging from about 40% to about 60%.

5. The 3D printer of claim 1, wherein the through bores have a uniform size ranging between from about 0.06 inches to about 0.30 inches in diameter.

6. The 3D printer of claim 1, wherein the through bores have a non-uniform size range from about 0.06 inches to about 0.30 inches in diameter.

7. The 3D printer of claim 1, wherein the diffuser plate is located a distance in the ductwork from an inlet to the heater at a ratio of the distance to the height of the diffuser plate that ranges from about 1:1 to about 2:1.

8. The 3D printer of claim 1, wherein the ductwork comprises a substantially straight configuration wherein the inlet is below the outlet in the heated build chamber.

9. The 3D printer of claim 8, wherein the ductwork comprises a constricted zone proximate the inlet and an expanded zone proximate the outlet, wherein the heater and the perforated diffuser plate are located in the expanded zone.

10. The 3D printer of claim 1, wherein the ductwork comprises a substantially "U" shape wherein the inlet and the outlet are located proximate the print plane.

11. The 3D printer of claim 10, wherein the ductwork having the substantially "U" shape comprises:
    a substantially straight first portion in communication with the inlet, wherein the fan is located in the substantially straight first portion;
    an arcuate portion in communication with the substantially straight first portion; and
    a substantially straight second portion in communication with the arcuate portion, wherein the heater and the perforated diffuser plate are located in the substantially straight second portion.

12. A 3D printer system configured to print parts by depositing molten extruded material along tool paths, the system comprising:

a chamber comprising opposing side walls;
a print head configured to extrude molten build material;
a platen on which the molten extruded build material is to be deposited along tool paths to print a part in a layer-wise manner within the chamber, the platen configured to move between the opposing side walls; and
a heating system for locally heating the chamber in a build plane above the platen, the heating system comprising opposing air intake and exhaust systems located on exterior surfaces of the opposing side walls, each air intake and exhaust system comprising:
ductwork having an inlet configured to intake air from the chamber and an outlet configured to exhaust air into the chamber proximate the build plane in a direction substantially parallel to the build plane;
a fan within the ductwork proximate the inlet and configured to draw air into the ductwork through the inlet and propel the air towards the outlet;
a heater within the ductwork proximate the outlet, the heater configured to heat the air as the air passes the heater before discharge from the outlet; and
a perforated diffuser plate within the ductwork and located between the fan and the heater, the perforated diffuser plate being oriented substantially orthogonal to the ductwork in the direction of airflow, wherein the perforated diffuser plate is located a distance in the ductwork from an inlet to the heater at a ratio of the distance to a height of the perforated diffuser plate that ranges from about 1:1 to about 2:1, wherein the perforated diffuser plate is configured to resist air flow and cause a pressure on an upstream side of the perforated diffuser plate to be raised and be substantially constant across a cross-sectional area of the ductwork proximate the perforated diffuser plate, the perforated diffuser plate having through bores configured in a pattern to allow air to pass therethrough such that the air has a substantially uniform velocity profile with laminar flow as the air engages the heater and when heated and exhausted into the heated build chamber, a temperature profile proximate the build plane is more uniform relative to an air intake and exhaust system without the perforated diffuser plate within the ductwork.

13. The 3D printer of claim 12, wherein the perforated diffuser plate has an open space ranging from about 35% to about 75%.

14. The 3D printer of claim 12, wherein the perforated diffuser plate has an open space ranging from about 37% to about 65%.

15. The 3D printer of claim 12, wherein the perforated diffuser plate has an open space ranging from about 40% to about 60%.

16. The 3D printer of claim 12, wherein the perforated diffuser plate includes through bores comprising rows and columns wherein through bores in adjacent horizontal rows are offset from each other and wherein through bores in adjacent vertical rows are offset from each other, wherein the perforated diffuser plate is configured to resist air flow to raise a pressure on an upstream side of the diffuser plate to be substantially constant across a cross-sectional area of the ductwork proximate the diffuser plate.

17. The 3D printer of claim 12, wherein the perforated diffuser plate has substantially uniformly spaced through bores configured to allow air to pass therethrough such that the air has a substantially uniform velocity profile with laminar flow as the air engages the heater.

18. The 3D printer of claim 12, wherein the ductwork comprises a substantially straight configuration wherein the inlet is below the outlet in the chamber.

19. The 3D printer of claim 18, wherein the ductwork comprises a constricted zone proximate the inlet and an expanded zone proximate the outlet, wherein the heater and the perforated diffuser plate are located in the expanded zone.

20. The 3D printer of claim 12, wherein the ductwork comprises a substantially "U" shape wherein the inlet and the outlet are located proximate the build plane.

21. The 3D printer of claim 20, wherein the ductwork having the substantially "U" shape comprises:
a substantially straight first portion in communication with the inlet, wherein the fan is located in the substantially straight first portion;
an arcuate portion in communication with the substantially straight first portion; and
a substantially straight second portion in communication with the arcuate portion, wherein the heater and the perforated diffuser plate are located in the substantially straight second portion.

* * * * *